July 5, 1966
G. KALJO ETAL
3,259,244
SCREEN WITH OPEN CONDUIT FEED
Filed Jan. 31, 1963
2 Sheets-Sheet 1
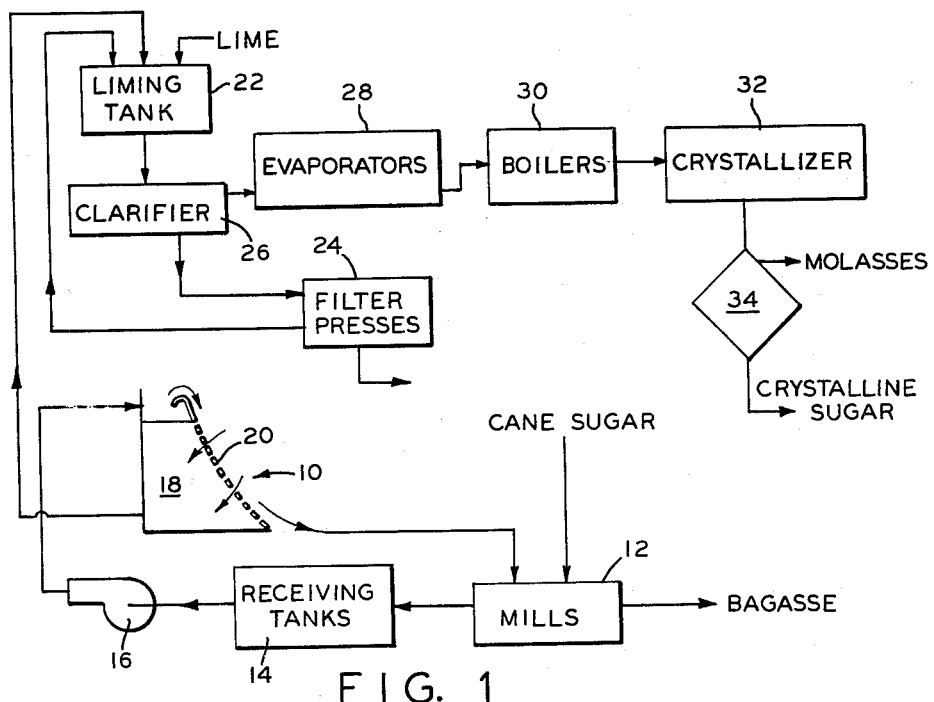
FIG. 1
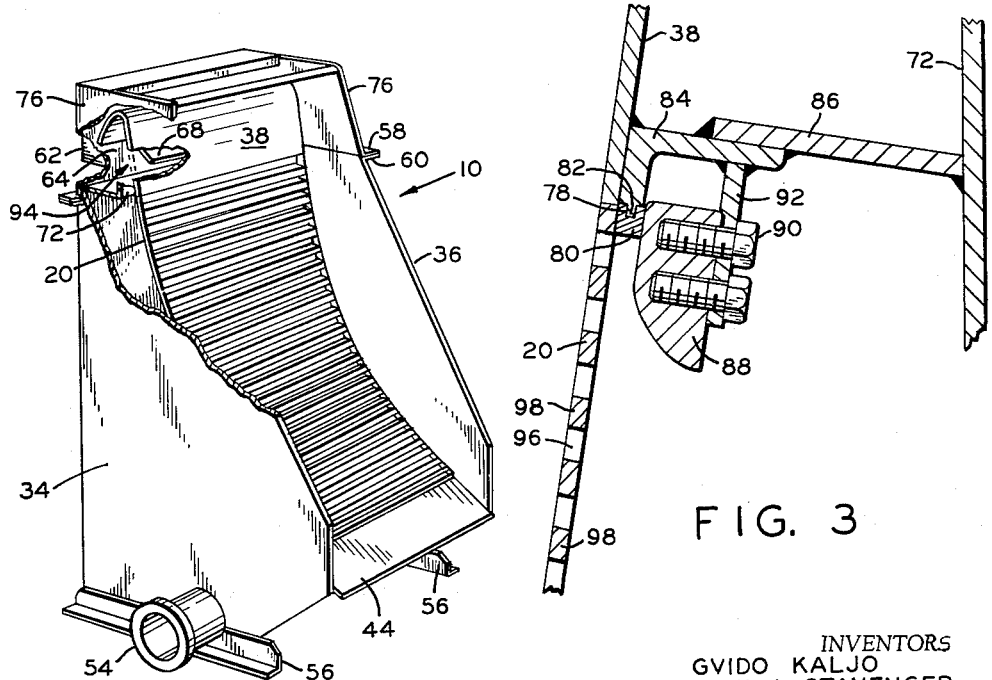
FIG. 2
FIG. 3
INVENTORS
GVIDO KALJO
PAUL L. STAVENGER
BY JAMES C. ELSKEN
Earle R. Marden
ATTORNEY.

INVENTORS
GVIDO KALJO
PAUL L. STAVENGER
BY JAMES C. ELSKEN

ATTORNEY.

United States Patent Office

3,259,244
Patented July 5, 1966

---

3,259,244
SCREEN WITH OPEN CONDUIT FEED
Gvido Kaljo, New Rochelle, N.Y., and Paul L. Stavenger, Westport, and James C. Elsken, Stamford, Conn., assignors to Dorr-Oliver Incorporated, Stamford, Conn., a corporation of Delaware
Filed Jan. 31, 1963, Ser. No. 255,249
6 Claims. (Cl. 209—240)

This invention relates generally to the separation of solids and liquids and more particularly to the wet screening of solids and liquids by means of a fixed screen for separating solid particles from a liquid or suspension and for wet classification of solids.

Prior to this invention fixed screens have been employed to perform many screening operations. Screens of this nature necessarily require a means to distribute evenly on the face thereof, the feed material which is to be screened. It is also necessary that the feed material enter the screening surface tangentially with a certain minimum velocity. To accomplish this, several types of feed members are in current use, the most common being the rectangular feed spout and the sharp-edged weir.

In the case of the rectangular feed spout, it is necessary to constrict the rectangular opening to build up a head of liquid behind the spout in order to obtain the required velocity. When screening at low flow rates, this opening becomes very small and stray or random over-size material in the feed can plug the spout.

In the case of the sharp-edged weir, the required velocity at the feed end of the screen is obtained by a falling height. However, the material in flowing over the weir tends to follow a parabolic free-fall trajectory corresponding to the particular flow rate. As flow rates which vary from the design or rated flow of the screen therefore adversely affect the required tangential entry of the feed upon the screen, it is necessary to constrain and direct the material flowing over the weir to ensure tangential impingement at the screen entry at all flow rates. It is conventional to effect this directional control by the use of a plate positioned to restrict the horizontal component of the free parabolic fall. However, because of the constraining device, this feed arrangement is also subject to plugging.

It is therefore an object of the invention to provide a fixed screen which has a feed member which is not prone to plugging and supplies the correct amount of feed material to the screen.

Another object of the invention is to provide a fixed screen which efficiently uses open conduit flow to supply feed material evenly to the screen.

A third object of the invention is to provide a fixed screen which employs a parabolic overflow type weir to deliver the feed material evenly at the desired velocity to the screen.

A still further object of the invention is to provide a fixed curved concave screen which employs a parabolic overflow type weir to deliver the feed material tangentially and evenly to the curved screen at the desired velocity.

A fifth object of the invention is to provide a fixed concave bar screen which employs a parabolic overflow type weir to deliver the feed material tangentially and evenly to the screen at the desired velocity.

Another object of the invention is to provide a screen which is more efficient, inexpensive, and readily manufactured.

A seventh object of the invention is to provide a fixed curve screen which employs recessed bolts to attach the screen to the feed member so that the screen surface and feed sections are in perfect registry in order to eliminate leakage.

Other objects and advantages of the invention will become clearly apparent as the specification proceeds to describe the invention with reference to the accompanying drawings in which:

FIG. 1 is a flow diagram of a raw sugar factory utilizing the new and improved screen design;

FIG. 2 is a perspective view of the new and improved screen design;

FIG. 3 is a blown-up partial section view of the means securing the screen to the parabolic weir.

Figure 4:
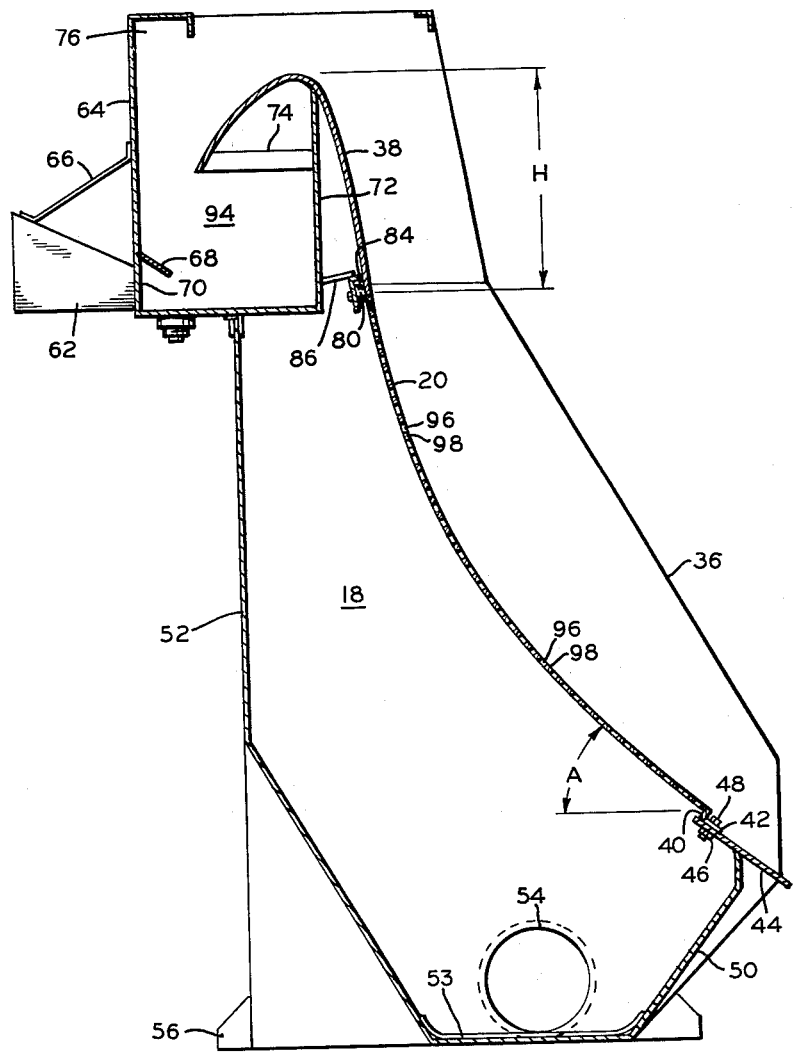
FIG. 4 is a section view through the screen shown in FIG. 2.

Looking now at FIG. 1 there is shown a typical use of the new and improved fixed screen 10. The use of screen 10 in a raw sugar flow sheet is only exemplary since obviously the screen 10 can be employed in many other various processes.

In operation the cane sugar is supplied to mills 12 wherein the juice is expressed from the sugar cane and delivered to the receiving tanks 14. The crushed cane pulp or bagasse left after the extraction of the juice is discharged from the mills 12 and is used for any suitable purpose. From the receiving tanks 14 the raw juice is pumped by pump 16 to the new and improved screen 10 where the desired juice product is collected in chamber 18 under the screen surface. The over-size particles of fibre and bits of cane are then recycled to the mills for further processing. In prior art sugar flow sheets the sceening operation was performed on coarse perforated screens from which the fibre is continuously removed by a drag conveyor. The fine fibre remaining in the juice after the drag screen makes it necessary to carry out a secondary screening operation. The hereinafter disclosed improved screen is of the type which eliminates the necessity of a secondary screening operation.

The screened juice in chamber 18 of screen 10 is then delivered to the liming tanks 22 wherein it is mixed with lime and press juice delivered from the filter presses 24. From the liming tank the mixed juice is clarified in the clarifier 26 with the clarified juice being delivered to the evaporators 28 and the scum being delivered to the filter presses 24 for the extraction of press juice which is recycled to the liming tanks 22. From the evaporators 28 the juice is processed successively in the boilers 30 and the crystallizers 32 and is delivered to the centrifuges 34 for separation of the crystalline sugar from the molasses. Under centrifugal force in the centrifuges the crystalline sugar is collected in the underflow while the overflow molasses are collected for any suitable use.

Looking now at FIGS. 2–4 the new and improved screen is shown in detail. In the preferred form of the invention the screen surface or deck 20 is the wedge-bar type similar to that shown in U.S. Patent 2,916,142 in the name of F. J. Fontein. In the preferred disclosed application a 45° bar screen is employed. The 45° configuration of the screen is a 45° arc of a circle. The face area of the screen is determined from the radius of the circle from which the 45° screen is figured from. Obviously it is within the scope of the invention to employ other types of screens, different face areas, and different arc sections depending on the characteristics of the system in which the screen is to be used. Preferably, the bar surface for use in screening sugar is made of bronze to inhibit bacterial growth and thereby eliminate frequent cleaning.

Screen surface or deck 20 is supported between end plates 34 and 36 tangentially to parabolic overflow weir 38 at the upper end with the sealing flange 40 abutting retainer plate 42 releasably secured to adjustable discharge spout 44 by nut 46 and bolt member 48. The collection chamber 18 for the desired underflow is basically defined by the screen deck 20, front plate 50, rear plate 52, a bottom plate 53, and the end plates 34 and 36. Discharge pipes 54 are located in both of the end plates 34 and 36 to discharge the underflow from chamber 18. Support members 56 are welded or otherwise secured to the end plates 34 and 36 to support the screen 10.

For the purpose of delivering feed material to the screen deck 20 a feed box having flanges 58 is bolted or otherwise secured to flanges 60 on the end plates 34 and 36. A feed material inlet conduit 62 secured to the back wall 64 of the feed box and rigidly supported by angle brace 66 delivers the feed material into the feed box. A baffle member 68 is secured to the back wall 64 and extends over the feed box inlet opening to evenly distribute the incoming feed material with the feed box. Parabolic weir 38 is supported within the feed box by front wall member 72 and a plurality of braces 74 which extend between the parabolic weir and the front wall member 72. Parabolic weir 38 extends the full width between end walls 76 of the feed box and is sealed thereto to prevent leakage of feed material around the weir.

As previously pointed out screen deck 20 is replaceably secured tangent to the parabolic weir 38 by a recessed mounting means in order to provide a close fit of the weir and the screen to prevent leakage of the feed material between the members. FIGURE 3 shows in detail this mounting means which is schematically represented in FIG. 4.

Screen deck 20 basically is secured in position by the abutment of sealing flange 40 against retainer plate 42 and by the engagement of the notch 78 in channel bar 80 with the ridge member 82 on angle member 84 which is welded or otherwise secured to the parabolic weir 38 and to the support member 86. Support member 86 in turn is welded or otherwise secured to front wall member 72 of the feed box. Channel bar 80 extends the full length of the screen and abuts shim member 88 which is secured by bolts 90 to support member 92 welded to the angle member 84. Shim member 88 provides rigid support for the screen deck 20 and holds the screen deck in correct alignment with the parabolic weir 38.

In operation the feed material to be separated is introduced in the feed box chamber 94 and rises to a point where it spills over the parabolic weir 38. The feed material then falls substantially and tangentially over the full width of the upper screen surface at a predetermined velocity. The feed material, which normally is in the form of a slurry flows down the screen deck 20 at right angles to the openings 96 between the bars 98. Due to the drag on the slurry passing over the bars, a thin layer on the underside is deflected and passes out between the bars. The material collected in the discharge chamber 18 is delivered out of the screen through discharge conduits 54 while the oversize particles fall off the end of the screen deck and are collected for any desired use. In our particular application the oversize particles are recycled to the mills.

As previously pointed out, the disclosed screen 10 encompasses the use of an open type feed box in order to eliminate the problem of plugging. Prior to this invention it has been difficult to supply feed material tangential to the screen surface with the proper velocity when the feed material contained large oversize pieces. Therefore, to obtain a proper feed velocity tangential to the screen from an open type feed box the proper falling height (H) must be selected and the feed slurry must be guided onto the screen surface tangentially.

This can be accomplished by the use of a parabolic weir having a contour which substantially corresponds to the parabolic free-fall path of the rated flow of feed slurry over a sharp-edged weir dam, hereinafter referred to as the free-fall parabolic shape. In other words the contour of the disclosed weir is the parabolic path which would be followed by a particle falling free from the top of sharp-edged weir.

With screens having slot widths down to 0.35 mm. a feed velocity of 10 ft./sec. was found to be satisfactory for most materials. In the particular disclosed embodiment a falling height of 20 inches would provide a feed velocity to the screen of 10 ft./sec.

The feed velocity limitation is not an arbitrary one. It was found by plotting the ratio of the quantity of material through the screen over the total quantity of feed versus a Reynolds number as defined below. It was found at above a certain Reynolds number the curve tended to flatten out, indicating that there is a critical feed velocity above which the efficiency of separation does not materially increase. For the screens plotted a Reynolds number of about 300 was found to be in the critical area.

$$Rc = \frac{v\rho s}{M}$$

$v$ = velocity at feed spout
$s$ = screen slot width
$M$ = viscosity of medium
$\rho$ = density From the above formula knowing the appropriate Reynolds number it can be seen that the velocity can be computed since the screen slot width, the viscosity, and the density is fixed for any particular feed material and screen. Once the feed velocity has been determined it is a simple matter to determine the falling height (H) required to provide the determined feed velocity at the entrance to the screen.

As indicated previously the preferred screen is a 45° screen, but obviously other arc length screens can be employed with one limitation. It has been found that the end of the screen must be inclined at least 30° above the horizontal in order to be able to discharge solids from the screen. This angle corresponds to angle A in FIG. 4.

It is therefore obvious that we have disclosed a new and novel screening apparatus which eliminates the problem of plugging and/or overshooting of the screen surface by the feed material. Further, our disclosed apparatus does not require the use of complicated devices to direct the flow of feed material onto the screen surface at the proper angle. Also we have provided a new and novel screening apparatus which is rigid and readily manufactured and at the same time provides improved screening characteristics.

Although we have described in detail the preferred embodiment of our invention, we contemplate that many changes may be made without departing from the scope or spirit of our invention, and we desire to be limited only by the claims.

We claim:

1. A structure for screening slurries having random oversize particles comprising: a bar screen having a feed end and a discharge end, said screen having openings between the bars thereof of a certain predetermined size, an open feed box, a weir operably associated with said open feed box having substantially a free-fall parabolic shape, said weir having a lower end tangential to the feed end of said screen, means supporting the discharge end of said screen at an angle greater than 30° from the horizontal, means supplying a feed material to said open feed box to overflow said weir, said weir being located above said screen with the top of said weir being above the feed end of said screen a certain predetermined distance to provide a falling height corresponding to a desired material feed velocity at the feed end of said screen whereby particles in the feed material above a certain size will discharge at the discharge end of said screen and particles in the feed material below a certain size will pass through the openings in said screen.

2. The structure of claim 1 wherein said screen is curved with its concave side presented to the feed material.

3. Apparatus for separating particles according to size comprising: a concave bar screen having a feed end and a discharge end, each bar in said screen being spaced a predetermined distance from the next adjacent bars in said screen, an open feed box above said screen feed end, a weir in flow communication with said feed box having a substantially free-fall parabolic shape and being tangent to said screen feed end, means securing said screen feed end substantially flush with said weir to provide a continuous surface for the flow of feed material from said weir onto said screen, said screen curving outwardly from said weir with the discharge end of said screen being at an angle greater than 30° from the horizontal, and means supplying a feed material to said open feed box to overflow said weir.

4. The structure of claim 3 wherein said securing means are on the underside of said screen.

5. Apparatus for separating particles according to size comprising: a concave screen having a feed end and a discharge end, said screen having openings therein of a predetermined size, an open feed box, a substantially free-fall parabolic weir in flow communication with said feed box and tangent to said screen feed end, means securing said feed end substantially flush with said weir to provide a continuous surface for the flow of feed material from said weir onto said screen, said screen curving outwardly from said weir with the discharge end of said screen being at an angle greater than substantially 30° from the horizontal, and means supplying a feed material to said open feed box at a rate to overflow said weir, said parabolic weir being located above said screen with the top of said weir being above the feed end of said screen a certain predetermined distance to provide a falling height which corresponds to a desired feed velocity of the feed material at the feed end of the screen whereby particles in the feed material above a certain size will discharge at the discharge end of the screen and particles in the feed material below a certain size will pass through the openings in said screen.

6. The structure of claim 5 wherein said securing means are on the underside of said screen.

References Cited by the Examiner

UNITED STATES PATENTS

| | | | |
|---|---|---|---|
| 369,836 | 9/1887 | Blackman | 209—17 |
| 2,916,142 | 12/1959 | Fontein | 209—273 |

FOREIGN PATENTS

| | | |
|---|---|---|
| 446,816 | 2/1949 | Canada. |
| 1,126,325 | 7/1956 | France. |

HARRY B. THORNTON, *Primary Examiner.*

HERBERT L. MARTIN, *Examiner.*

R. HALPER, *Assistant Examiner.*